(12) United States Patent
Hostetler (10) Patent No.: US 7,929,684 B2
(45) Date of Patent: Apr. 19, 2011

(54) HIGH AVAILABILITY MULTI-TENANT FEATURE

(75) Inventor: Larry B. Hostetler, Phoenix, AZ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2263 days.

(21) Appl. No.: 10/628,714

(22) Filed: Jul. 28, 2003

(65) Prior Publication Data

US 2005/0025303 A1 Feb. 3, 2005

(51) Int. Cl.
 *H04M 3/00* (2006.01)
 *H04M 5/00* (2006.01)
 *G06F 15/173* (2006.01)
 *G06F 11/00* (2006.01)

(52) U.S. Cl. .............. 379/265.02; 379/265.01; 709/224; 714/47

(58) Field of Classification Search ............... 379/32.01, 379/265.02, 269, 265.01; 709/223, 224; 714/1, 6, 11, 12, 47; 718/102; 707/200
See application file for complete search history.

(56) References Cited

U.S. PATENT DOCUMENTS

| | | | | |
|---|---|---|---|---|
| 6,111,947 A | * | 8/2000 | Galgano et al. | 379/269 |
| 6,137,862 A | * | 10/2000 | Atkinson et al. | 379/32.01 |
| 6,188,761 B1 | * | 2/2001 | Dickerman et al. | 379/265.01 |
| 6,594,786 B1 | * | 7/2003 | Connelly et al. | 714/50 |
| 6,697,858 B1 | * | 2/2004 | Ezerzer et al. | 709/224 |
| 6,918,115 B2 | * | 7/2005 | Vargas et al. | 718/102 |
| 2004/0059957 A1 | * | 3/2004 | Menasce et al. | 714/1 |
| 2005/0021567 A1 | * | 1/2005 | Holenstein et al. | 707/200 |

* cited by examiner

*Primary Examiner* — Ahmad F Matar
*Assistant Examiner* — Sonia Gay
(74) *Attorney, Agent, or Firm* — Fay Sharpe LLP (57) ABSTRACT

A multi-tenant call-center system and method of configuring and monitoring. The system includes a plurality of telephone lines, a plurality of agent positions, a call distribution system connecting the plurality of agent positions to the telephone lines, a call management system connected to the call distribution system. The call management system includes a storage system of storing database files, processes and configuration files, a memory system for processing the database files and configuration files and running selected processes stored on the storage system, a configuration server for reading the configuration file and starting selected processes according to multi-tenant inter-process dependencies and process priorities, and a monitor process for monitoring each of the started processes according to a respective monitor frequency in the configuration file.

10 Claims, 6 Drawing Sheets

Figure 6:
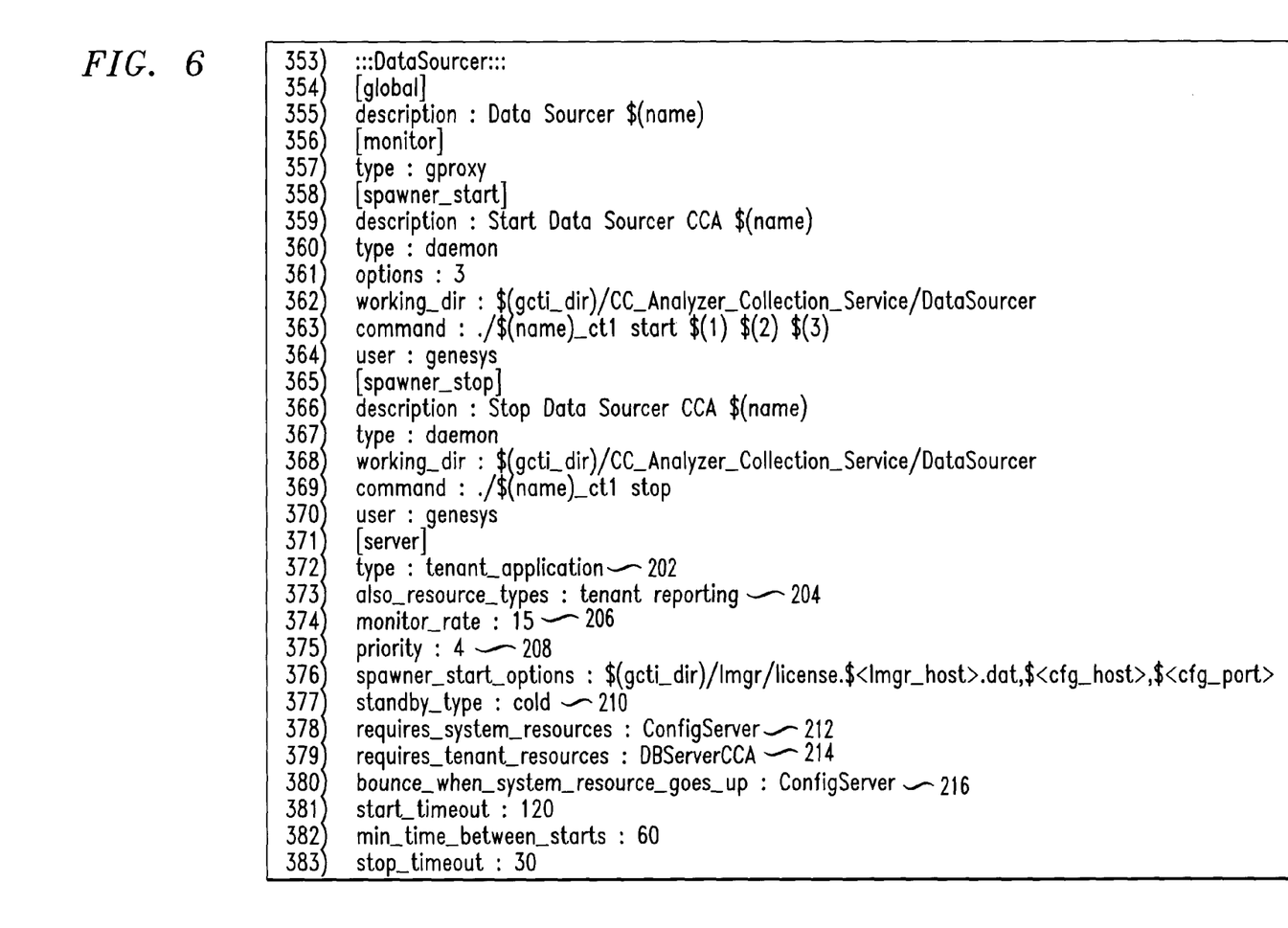
FIG. 6 is an exemplary extract of a configuration file according to the present invention.

```
353) :::DataSourcer:::
354) [global]
355) description : Data Sourcer $(name)
356) [monitor]
357) type : gproxy
358) [spawner_start]
359) description : Start Data Sourcer CCA $(name)
360) type : daemon
361) options : 3
362) working_dir : $(gcti_dir)/CC_Analyzer_Collection_Service/DataSourcer
363) command : ./$(name)_ct1 start $(1) $(2) $(3)
364) user : genesys
365) [spawner_stop]
366) description : Stop Data Sourcer CCA $(name)
367) type : daemon
368) working_dir : $(gcti_dir)/CC_Analyzer_Collection_Service/DataSourcer
369) command : ./$(name)_ct1 stop
370) user : genesys
371) [server]
372) type : tenant_application ~ 202
373) also_resource_types : tenant reporting ~ 204
374) monitor_rate : 15 ~ 206
375) priority : 4 ~ 208
376) spawner_start_options : $(gcti_dir)/lmgr/license.$<lmgr_host>.dat,$<cfg_host>,$<cfg_port>
377) standby_type : cold ~ 210
378) requires_system_resources : ConfigServer ~ 212
379) requires_tenant_resources : DBServerCCA ~ 214
380) bounce_when_system_resource_goes_up : ConfigServer ~ 216
381) start_timeout : 120
382) min_time_between_starts : 60
383) stop_timeout : 30
```

HIGH AVAILABILITY MULTI-TENANT FEATURE

BACKGROUND OF INVENTION

The invention generally relates to a system and method for routing and reporting of customer interactions across voice, e-mail and Web channels, particularly with respect to systems supporting multi-client or multi-tenant call center applications. Companies have a need to identify and precisely route customer interactions based on the company's unique business criteria. Customer data and interaction history are used to make routing decisions, and deliver relevant information to agents so that they can most effectively meet a customer's needs or engage them in a new opportunity.

The term "process" as used herein refers to a UNIX or UNIX-like operating system term. In UNIX, while a program or command is running, it is called a process. A process exists for each UNIX command or program that is currently running. A process is also sometimes referred to as a "task." Call center routing programs or processes typically simultaneously handle routing requests for voice calls, e-mails, web interactions, and other media types. Each interaction type and origination receives the proper treatment and priority according to the business rules of the enterprise.

Implemented strategies may include, for example:

Database-Driven Routing. Routing according to information stored in an enterprise's database system, such as customer profile information or account history.

Agent Profile Routing. Routing to the agent who possesses the skill or combination of skills needed to most effectively handle a customer.

Service-Level Routing. Routing according to the specified service level for a customer segment.

Last Agent or Relationship-based Routing. Routing to a specific agent such as the last agent who helped the customer or the personal agent of the customer.

Routing Across a multi-site contact center.

Enterprise Routing allows an enterprise to route incoming calls to the most appropriate agent in a multi-site contact center, regardless of location.

Other call center applications display statistics and information in real time, allowing managers to view factors that are relevant to their business objectives. Call center applications also maintain a constant status of all contact center resources-agents, groups of agents, queues and ports within a single site, or across a multi-site contact center. Complete historical views of customer interactions and trends are provided by other call center applications.

The applications described above have been described with respect to an individual client running call center applications on a multi-client system, where the system is simultaneously hosting clients numbering, for example, in the hundreds. As a result, applications numbering in the thousands are being monitored and controlled by the multi-client system, creating a heavy processing burden for the system.

It is customary in the art to monitor, start and stop applications and resources with a single-threaded loop that serially checks the state of each application or resource and then takes appropriate action as necessary such as, for example, starting a required application. If a large number of applications are monitored in this fashion, however, the monitoring process becomes inefficient because of the length of the single-threaded loop and thus is unable to respond in a timely manner to events requiring action by the monitoring process.

Further, it is customary in the art, when there are multiple processes comprising applications, to encode inter-process dependencies and run-time priorities into the source files for the various programs controlling the applications. This technique is referred to in the art as hardcoding. When the applications become large and the number of processes become numerous, it becomes a difficult, time-consuming and error-prone task to maintain the high volume of inter-process dependencies and priorities.

There is a need for an improved method for configuring inter-process dependencies and run-time priorities in applications comprising a large number of processes in a multi-tenant environment.

Thus, there is also a need for a multi-tenant method that provides an improved, high-availability, monitoring process that responds to events in a multi-client call center system in an efficient, timely manner.

BRIEF SUMMARY OF INVENTION

In one aspect of the invention, in a multi-tenant call-center system hosting a tenant application and system processes, a method of configuring and monitoring the processes with respect to multiple tenants is provided. The method includes configuring the system in a configuration file, including defining dependencies between processes, defining a monitoring frequency for each process, defining a priority for each process, and grouping selected processes into tenant groups. The method also includes reading the configuration file by the call-center system, starting each process in the call-center system in correspondence to the configured multi-tenant dependencies and priorities, and monitoring each of the processes based on configured monitoring frequencies.

In another aspect of the invention, a multi-tenant call-center system is provided. The call-center system comprises telephone lines, agent positions, a call distribution system connecting the agent positions to the telephone lines, and a call management system connected to the call distribution system. The call management system includes a storage system for storing database files, processes and configuration files, a memory system for processing the database files and configuration files and running selected processes stored on the storage system, a configuration server for reading the configuration file and starting selected processes according to multi-tenant inter-process dependencies and process priorities, and a monitor process for monitoring each of the started processes according to a respective monitor frequency in the configuration file.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

DETAILED DESCRIPTION

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. In the drawings, like reference numerals denote like elements and similar reference numerals denote similar elements.

Figure 1:
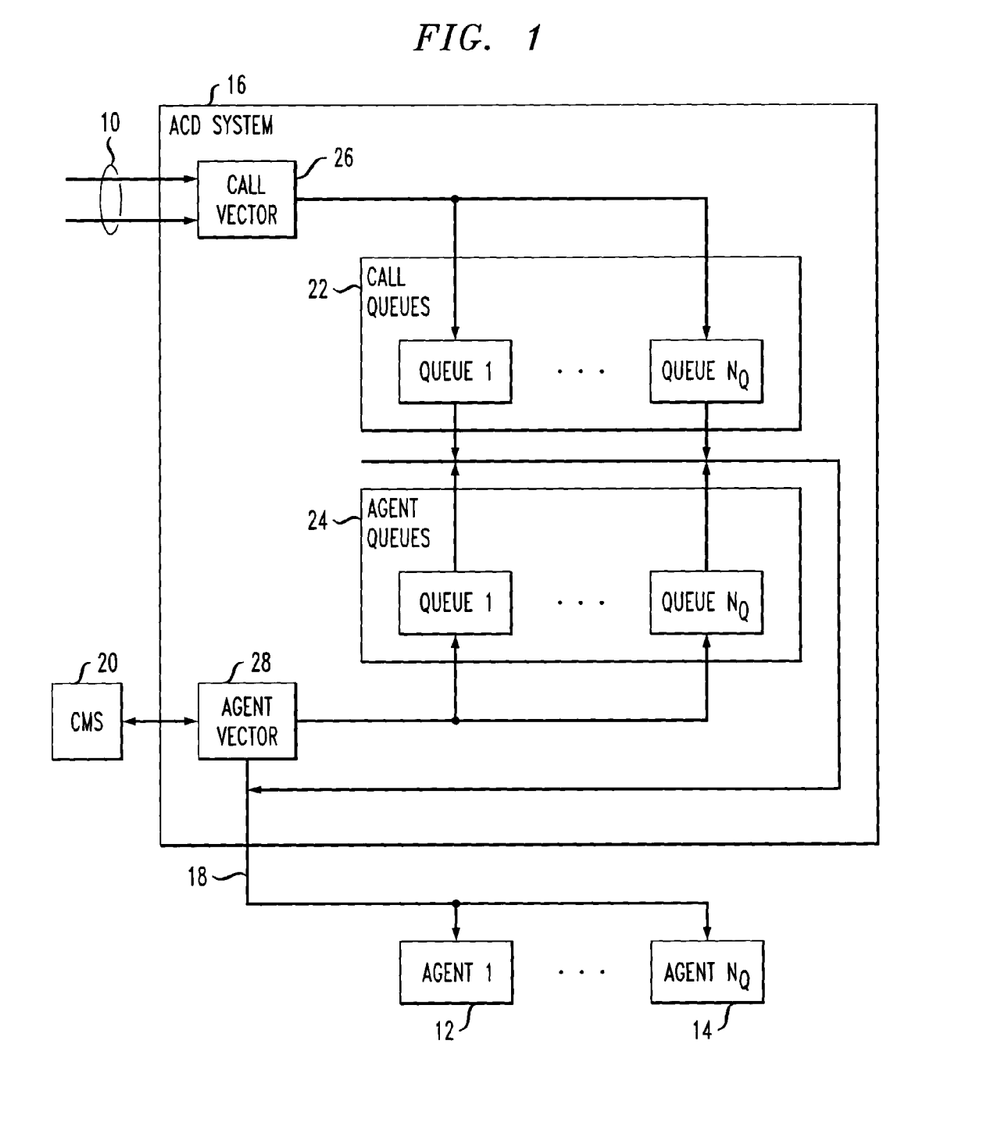
FIG. 1 is a schematic view of an exemplary call-center system suitable for practicing the present invention.

With reference to FIG. 1, an illustrative call center is shown. As is conventional, the call center comprises a plurality of telephone lines and/or trunks 10 selectively interconnected with a plurality of agent positions 12-14 via an automatic call distribution (ACD) system 16. Each agent position typically includes a voice-and-data terminal for use by a corresponding agent (not shown) in handling calls. Agent positions 12-14 are connected to the ACD system 16 by a voice-and-data transmission medium 18. Also connected to the ACD system 16 is a conventional call management system (CMS) 20 that gathers call records and call center statistics for use in managing the call center and in generating call center reports.

The ACD system 16 is a stored, program-controlled system that conventionally includes interfaces to external communications links, a communications switching fabric, service circuits (e.g., tone generators, announcement circuits, etc.), memory for storing control programs and data, and a processor for executing the stored control programs to control the interfaces and the fabric and to provide automatic call-distribution functionality. Such systems are known in the art and, therefore, the system will not be described in detail herein. However, an exemplary system is described in further detail in U.S. Pat. No. 5,903,641 and incorporated herein by reference. To summarize the system, included among the data stored in a memory of the ACD system 16 are a set of call queues 22 and a set of agent queues 24. Conventionally, calls are prioritized, and either are enqueued in individual ones of the call queues 22 in their order of priority or are enqueued in different ones of a plurality of call queues that correspond to a skill and each one of which corresponds to a different priority. Likewise, each agent's skills are typically prioritized according to his or her level of expertise in that skill, and either agents are enqueued in individual ones of the agent queues 24 in their order of expertise or are enqueued in different ones of a plurality of agent queues that correspond to a skill and each one of which corresponds to a different level of expertise. Included among the control programs in a memory (e.g., RAM, ROM, disk, or some other storage device) of the ACD system 16 are a call vector 26 and an agent vector 28. Calls incoming to the call center on the lines or trunks 10 are assigned by the call vector 26 to different call queues 22.

Figure 2:
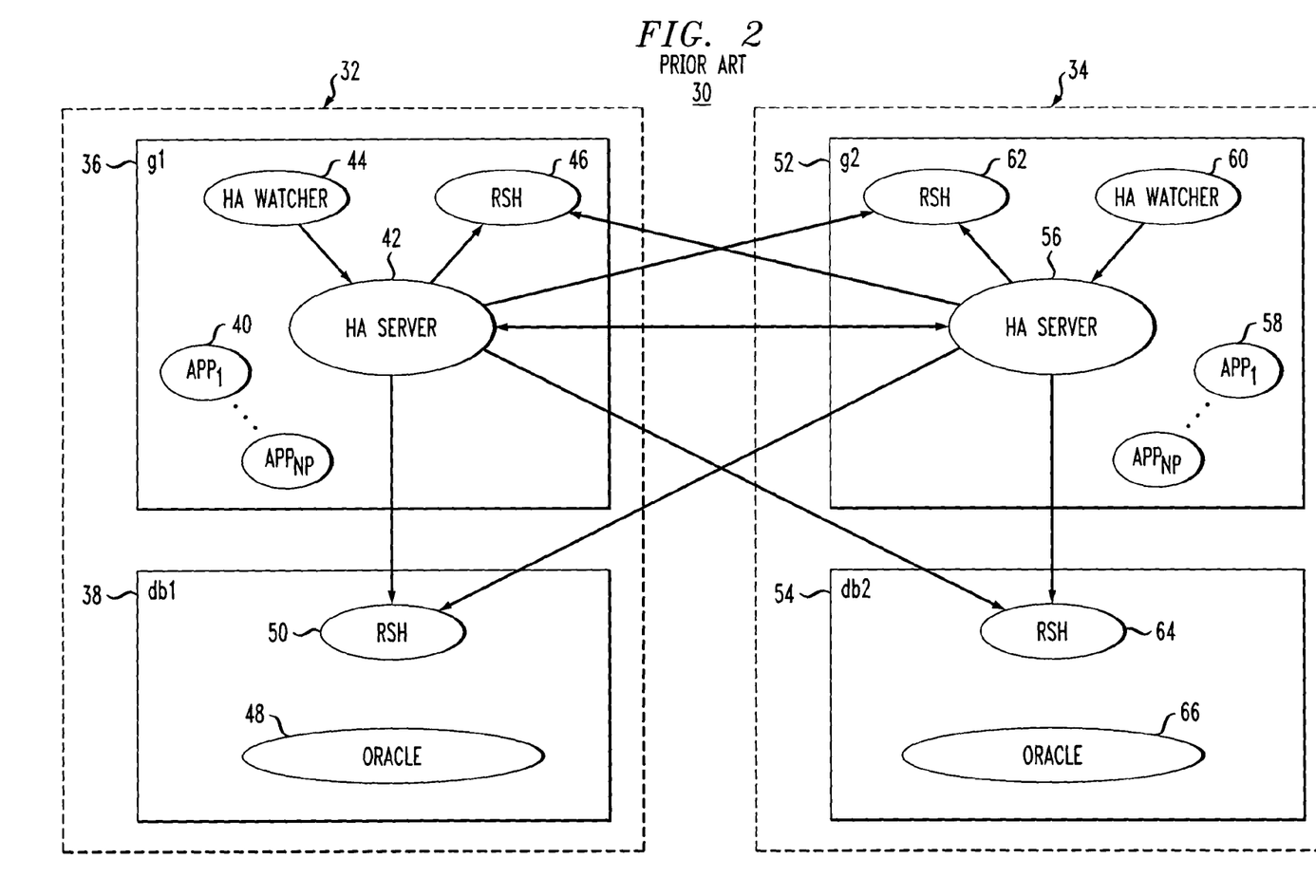
FIG. 2 is a representation of an exemplary prior art call center processing system.

The present invention relates to a multi-client system wherein each client hosted on the multi-client system has a CMS 20 running a respective set of applications dedicated to the respective client. A multi-client system advantageously includes a means and method of monitoring, starting and stopping the applications on a timely basis. With reference to FIG. 2, a prior art multi-client monitoring system 30 is illustrated. While only a single server system is optionally employed, the monitoring system 30, as illustrated, is a duplex system having essentially identical monitoring systems 32 and 34. Each of the monitoring systems 32 and 34, although not required, may be further divided into separate systems to distribute the processing load. For example, the first monitoring system 32 includes a first application server 36 and a first database server 38.

Within the first application server 36, a first plurality of client applications 40, for a plurality of clients, are being monitored by a first High-Availability (HA) Server 42. The client applications are primarily performing the above-described call center functions, although they are not limited with respect to the type of functions that may be performed. A first HA Watcher 44 monitors the first HA Server 42, and starts or stops the first HA Server as necessary. The first HA Server 42 is network connected for receiving administrative connections to the system. For example, a connection can be made to the first HA Server 42 by means of a standard telnet command through port 4006. This technique is standard, and well known in the art.

The HA Server 42 is configured to maintain an admin state for each of the client applications 40, for example, whether each application is in an up state or a down state. Most applications can be monitored by standard operating system utilities such as the UNIX ps command. While the embodiments described herein are described with respect to a UNIX operating system, other operating systems and utilities are well known in the art and have similar utilities. The ps command is used in UNIX to view current running processes and certain information about the state of each process. Most applications running on the first monitor system 32 are running as processes that can be monitored by means of the ps command. However, some applications, such as a database application, cannot have their state adequately determined by the ps command. In the case of a database application, another method such as a standard SQL query may be used to determine the state of the database application. Other means of monitoring applications include timestamp files generated by the respective applications, and monitor tools using, for example, the well known Simple Network Management Protocol (SNMP). SNMP is described formally in the Internet Engineering Task Force (IETF) Request for Comment (RFC) 1157 and in a number of other related RFCs.

The first HA Server 42 starts or stops applications, as necessary, to reach the appropriate admin state for the respective applications. The HA Server 42, however, does not itself start and stop an applications. Rather, a first RSH application 46 using a standard operating system utility such as rshell is utilized for this purpose.

The first database server 38, hosting a database application 48, includes a second RSH application 46, in communication with the first HA Server 42, for starting and stopping applications on the database server 38. Although the nomenclature used herein describes the first database server 38 as a database server, technically, the server is used to distribute processing loads on a second computer system and, therefore, may be used as a server for any suitable applications.

A duplex system is illustrated for teaching a preferred embodiment of the present invention, the system including the second monitoring system 34 that further includes a second application server 52, a second database server 54, a second HA Server 56, a second plurality of client applications 58, a second HA Watcher 60, a third HA RSH application 62, a fourth RSH application 64, and a second database application 66. While the second monitoring system 34 is essentially a duplicate of the first monitoring system 32, there are several different techniques for utilizing the second monitoring system 34.

In duplex embodiments, each HA Server 42 and 56 is configured to monitor the entire system including first monitoring system 32 and second monitoring system 34. However, the first HA Server 42 normally serves as a master while the second HA Server serves as a slave. The slave HA Server 56 monitors the entire system but does not start and stop applications, leaving that task to the master HA Server 42. While the first HA Master is described herein as a master, it is to be understood that the master/slave relationship is negotiated between the first HA Server 42 and the second HA Master 56 such that there one master HA Server and one slave HA Server, the slave taking over in the event of a failure of the master HA Server.

Each of the applications configured to run on either of the monitoring systems 32,34 can be configured with one of several active/standby run status modes. Some applications may be configured to run in a "cold" active/standby mode. In this mode, one copy of the selected application runs, either on the first monitoring system 32 or the second monitoring system 34, while the remaining copy remains stopped or idle. Other applications can be configured to run in a "warm" active/standby mode. In this mode, both copies of the selected application run, one copy on the first monitoring system 32 and one copy on the second monitoring system 34, however, one of the copies is inactive. In another "hot" active/standby mode, both copies of the selected application run, however, with one in standby, but with its state kept current as in the remaining copy. In yet another "load sharing" active/standby mode, both copies of the selected application run and actively handle requests, sharing the overall load.

Figure 3:
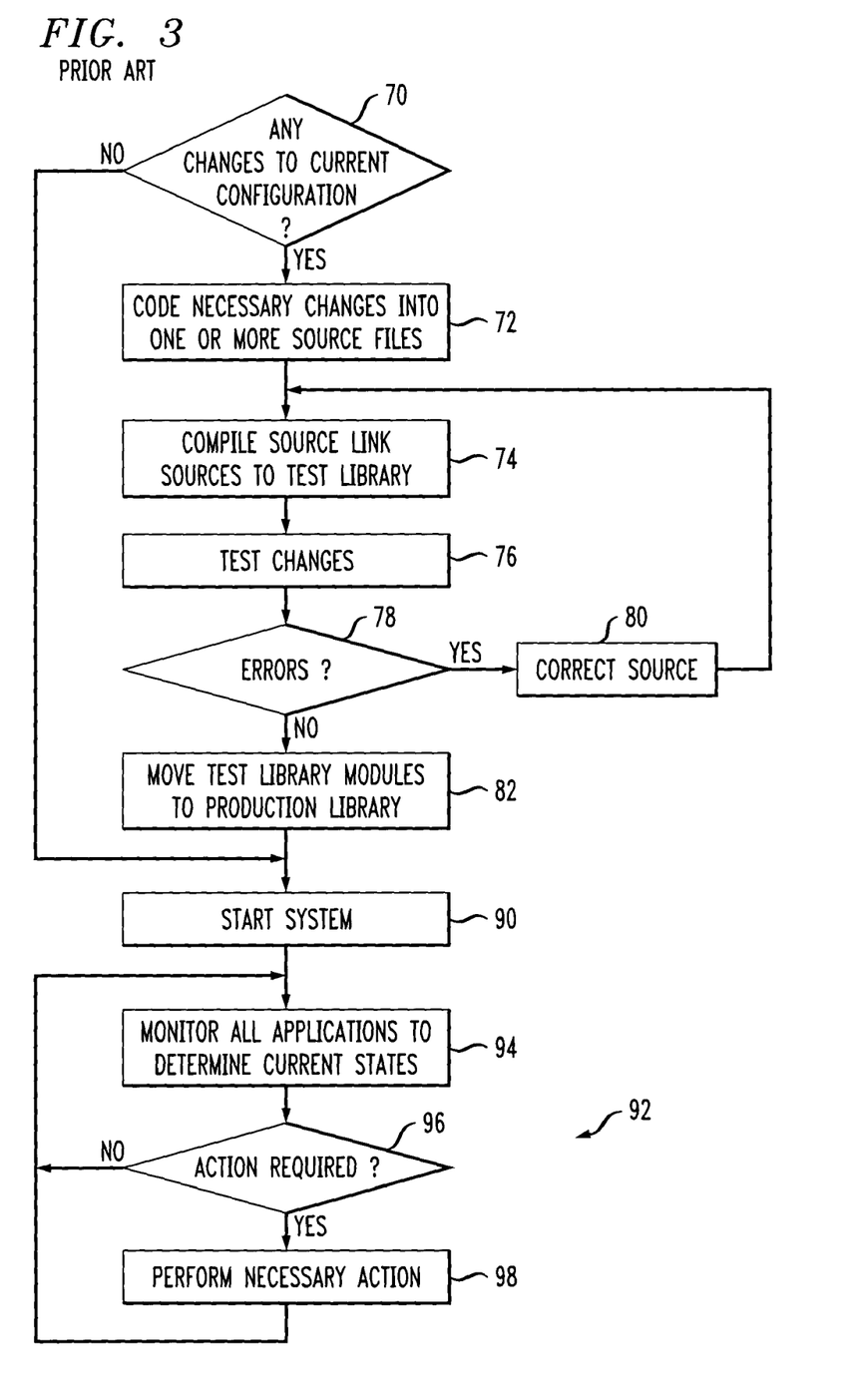
FIG. 3 is a flowchart of a prior art method of configuring and monitoring the call center system of FIG. 2.

With reference now to FIG. 3, an exemplary prior-art method of configuring and running the monitoring system of FIG. 2 is shown. Prior to running the monitoring system 30, a determination 70 is made as to whether any configuration changes to the system 30 are required. If a configuration change is required, to support a new client for example, necessary changes are coded 72 into one or more monitoring system program source files as necessary. The modified source files are then compiled and linked 74 to a test library containing compiled object and executable files. The compiled modifications are then tested 76 and a success/error determination is made 78 regarding the intended effects of the modifications. If errors are encountered, the source files are corrected 80 to resolve the respective errors, and the compilation 74 and testing 76 are repeated. Once a successful test has been attained, typically, the test library object and executable files are moved to a production library 82 for enabling the modifications in the production, run-time environment.

The configured monitoring system 30 is, according to customary practice, started at step 90, initially without any applications running except necessary system processes. The system 30 then monitors the state of all configured applications, such as client applications 40, 58 and database applications 48, 66 in a single-threaded loop 92 to check the state of configured applications and once the state of the applications is determined, the system performs any necessary actions such as starting or stopping applications according to the overall view of the system and according to inter-process dependencies. In the exemplary single-threaded loop 92, the configured applications are monitored at step 94 to determine their current individual states. An action determination 96 is made for each of the monitored applications, and if action is necessary, the appropriate action is performed 98 on the respective application. The single-threaded loop 92 is then repeated.

The above-described multi-client monitoring system 30 has several drawbacks that become significant when the number of clients and, consequently, the number of client applications becomes large. The configuration of the system 70-82 becomes time-consuming and error prone. For example, when configurations are "hardcoded" into a system, it becomes problematic to find the necessary files or modules requiring modification. Further, the knowledge required to make the appropriate configuration changes becomes esoteric in nature, making it difficult to train new personnel to accurately and efficiently implement configuration changes. Therefore, a preferred embodiment of the present invention is described herein to solve the aforementioned drawbacks.

Figure 4:
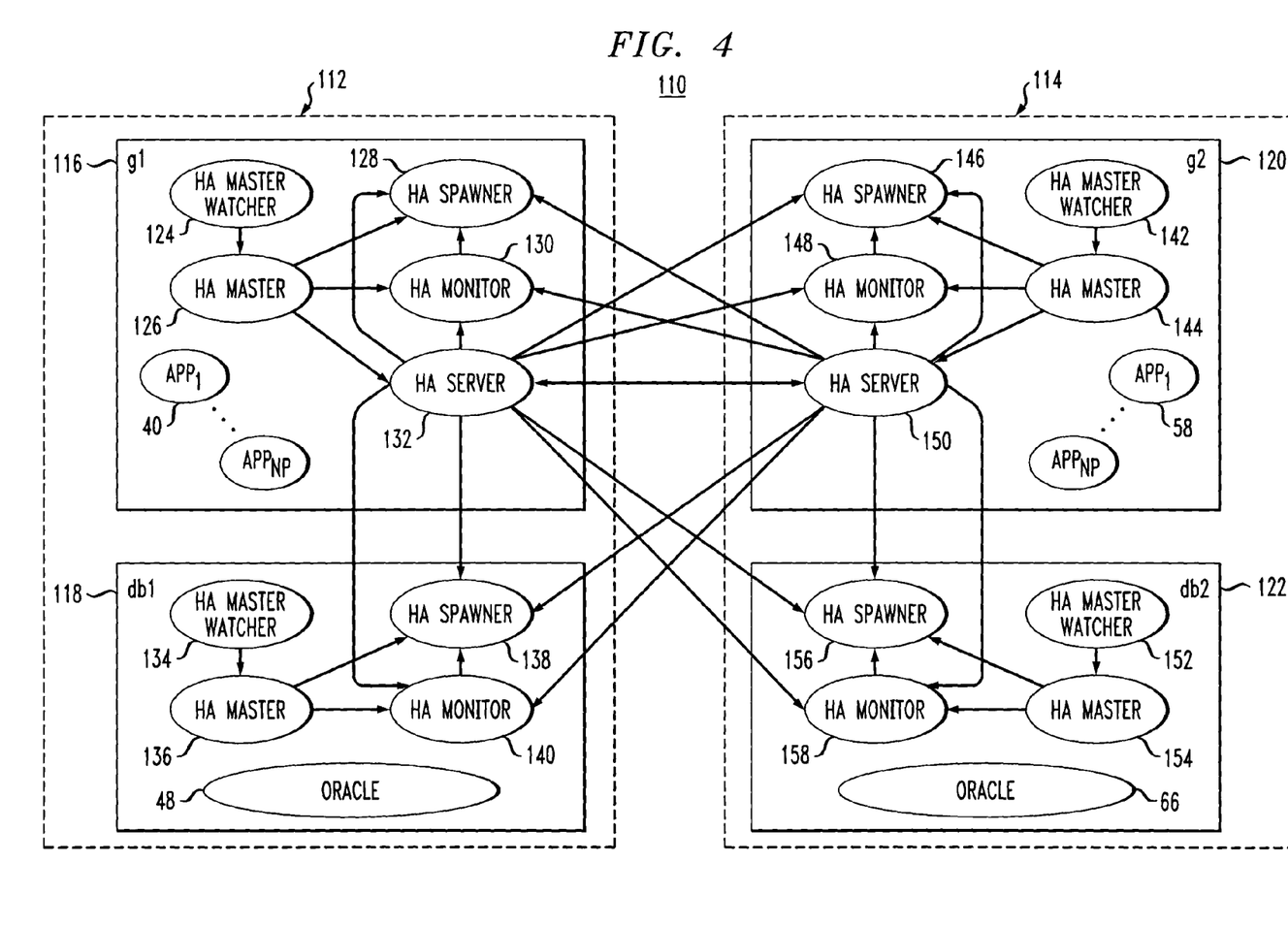
FIG. 4 is a representation of an exemplary call center processing system according to the present invention.

With reference now to FIG. 4, a preferred embodiment of a multi-tenant monitoring system 110 is illustrated. Like the prior art system of FIG. 2, only a single server system may be employed, however, the preferred embodiment of the monitoring system 110 is a duplex system having essentially identical monitoring systems 112 and 114. Similarly, each of the monitoring systems 112 and 114 is further divided into separate systems to distribute the processing load. For example, the first monitoring system 112 includes a first application server 116 and a first database server 118, and the second monitoring system 114 includes a second application server 120 and a second database server 122, each configured to be similar to the first application and database servers 116 and 118.

As before, the first plurality of client applications 40 are being monitored, where like numerals represent like applications or programs. Thus, the database application 48, the second plurality of client applications 58 and the second database application 66 are included in the monitoring system 110. The processes monitoring the applications are, however, different from the prior-art solution previously described.

The first application server 116 includes a first HA Master Watcher 124, a first HA Master 126, a first HA Spawner 128, a first HA Monitor 130 and a first HA Server 132. The first database server 118 includes a second HA Master Watcher 134, a second HA Master 136, a second HA Spawner 138 and a second HA Monitor 140. The second monitoring system 114 being essentially identical to the first monitoring system 112, the second application server 120 includes a third HA Master Watcher 142, a third HA Master 144, a third HA Spawner 146, a third HA Monitor 148 and a third HA Server 150. The second database server 122 includes a fourth HA Master Watcher 152, a fourth HA Master 154, a fourth HA Spawner 156 and a fourth HA Monitor 158. These programs are now described herein in further detail.

In comparison to the prior art application servers, 36, 38, 52 and 54, the resident monitoring processes have been sub-divided into multiple processes, each handling a more particular function of the monitoring system 110. Further, as described in further detail below, the sub-divided processes can be multithreaded as needed, rather than running in a large single-threaded loop.

In order to clearly distinguish features of the present invention from prior art features, each component of the monitoring system 110 that requires some level of monitoring is hereinafter referred to as a "resource." The set of resources is described hierarchically as follows:

Resource Classes
  Root objects.
  General classes of support resources, e.g. host, system application, database, etc.
  Specialized classes, e.g. a configuration server.
Resource Types
  Instances of resource classes.
  Define specific details of a resource class.

Are described in a file read by the various processes, e.g. HA.Resource Types.

Example resource type is "AgentMediator", based on the system application resource class.

Resources

Resources represent individual applications or hosts in the system.

Instances of resource types.

Define further details within the resource type.

Described in the file read by the process (e.g. HA.Resources).

Example resource instance is "aml", of the Agentmediator resource type, representing an application instance that runs on a particular system node.

The HA Spawner 128/138/146/156 is a process, in UNIX terminology, that executes operating system commands for other HA processes. Although there are four individual HA Spawners shown in the Figure, each HA Spawner is like the others, but is responsible only for processes on its respective system 116-122. The HA Spawner is similar to the first RSH application 46 which uses a standard operating system utility such as rshell this purpose. The HA Spawner, however, differs in several aspects. The HA Spawner has, in effect, learned some of the features of rshell, and performs those features within its own embodiment. For example, HA Spawner runs at a system root (super-user) level, and it can spawn commands as any user, at any operating priority level (e.g. UNIX "nice" level). It can be multi-threaded as needed to handle multiple requests at once, thereby improving responsiveness and reducing latencies. Because the HA Spawner is a special purpose program, as compared to the prior HA Server 42 which itself spawned rshell commands, it is reduced in size, and because of the reduced size, greatly reduces temporary memory requirements in a UNIX or UNIX-like environment where there is a "fork" memory cost involved when executing commands, the cost being proportional to the size of the program spawning the rshell commands.

The HA Spawner is further capable of spawning commands in several different ways. For one, it can spawn commands as daemon processes. The advantage of this technique is that the spawned command is unattached from the HA Spawner, stdout and/or stderr can be redirected to a file or /dev/null, and no further monitoring of the spawned process is required from the HA Spawner. The stdout and stderr streams are well known in the art of operating systems, as is /dev/null as a means for ignoring a stream. The HA Spawner can also spawn commands as timed processes. With this technique, the spawned process can be monitored by the HA Spawner 128/146, can be runtime limited by the HA Spawner, and can have stdout, stderr and/or the exit value returned to the requesting process as necessary.

Each HA Monitor 130/140/148/158, similar to each HA Spawner 128/138/146/156, is responsible only for resources on the respective host system node 116-122. Each monitored resource is configured with a respective monitor rate, thereby allowing critical resources to be monitored more frequently. Each HA Monitor, although responsible only for resources on its particular system node, broadcasts the state of each monitored resource to all HA Servers of the monitoring system 110.

Each resource monitored by the HA Monitor is configured with a monitor resource class. Exemplary monitor resource classes include:

Monitor by process ID (PID) as well known in the art. This is similar to the ps command, however, a significantly more efficient approach is used.

Monitor by PID and timestamp file, used to detect actual progress in the monitor process.

Monitor using UNIX command, allowing a script to check the state of a resource and respective outputs.

The HA Server processes 132/150, unlike the HA Spawner and HA Monitor processes, are only active on one node of each of the duplex monitoring systems 112-114. Each HA Server performs "master logic" for the entire system 110. The HA Server accepts administrative commands from network connected users to change admin states and to monitor resources. Although two HA Servers are shown in the Figure, only one is required if it is configured to run in "simple" mode. On the other hand, when running duplex on two nodes as illustrated, one HA Server acts as the master, while the other acts as a slave, taking over upon a failure of the master as previously described.

The HA Server understands configured start priorities and can start applications and resources in order of specified priorities. Further, configured dependencies between resources are understood, and the HA Server is able to determine when a resource may be started based on its respective resource dependencies.

The HA Server utilizes the "tenant" concept, which is an extension of the client concept wherein each tenant's or customer's resources and applications are grouped and associated with the particular customer, as opposed to global grouping for example. This further permits the HA Server to support dependencies within a tenant, and globally, as configured. Thus, admin start/stop states can be advantageously monitored globally, individually or by tenant.

The HA Masters 126/136/144/154 have an instance on each node of the monitoring system 110. It is essentially a simplified mix of the HA Spawner, HA Monitor and HA Server processes. The HA Master starts and stops the remaining HA processes, i.e. the HA Spawner, the HA Monitor, the HA Server and the HA Master Watcher process describe below. The HA Master process performs simple sanity checks of the remaining HA processes, essentially watching the "heartbeat" of the monitoring system 110.

The above-mentioned HA Master Watcher process 124/134/142/152 is a copy of the HA Master process 126/136/144/154 but monitors, starts and stops only the HA Master process. The HA Master process and the HA Master Watcher process are configured to watch each other, further improving system reliability.

Figure 5:
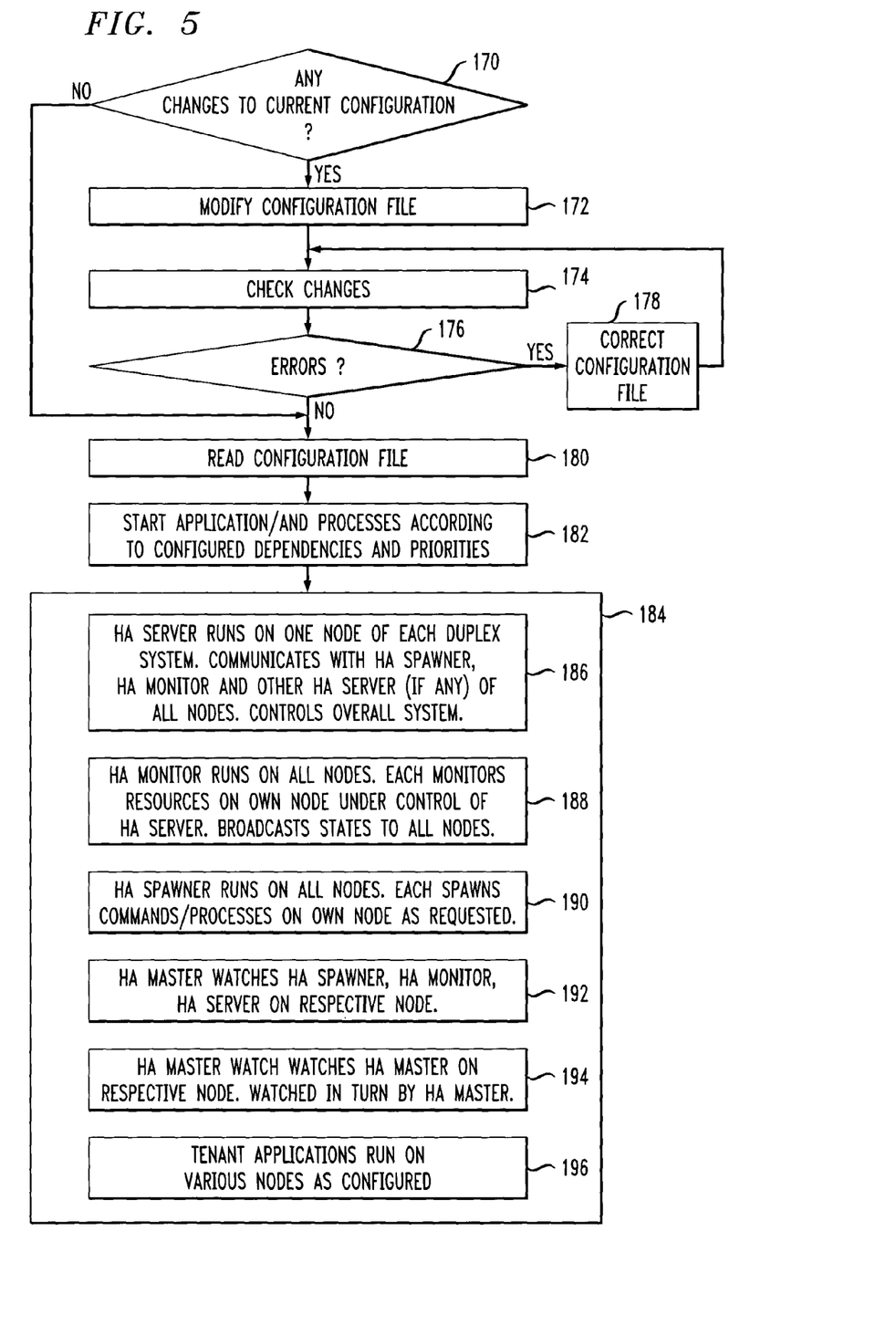
FIG. 5 is a flowchart of a method according to the present invention of configuring and monitoring the call center system of FIG. 4.

With reference now to FIG. 5, a generalized flow diagram of an embodiment of the present invention is provided. A determination 170 is first as to whether a configuration change is necessary. If configuration changes are determined necessary, a configuration file, e.g. a text configuration file, is modified 172 according to the desired changes. The modified configuration file is checked for validity 174, and a check is made 176 as to whether the modified configuration file is correct. This determination may include programmatic sanity checks of the file, overall system tests, and simple semantic checks as deemed necessary. If errors are determined 176 to be present in the configuration file, the file is corrected 178 and the check repeated until the file is error free.

When the monitoring system 110 is started, the configuration file is read 180 by all HA processes, and processes are started or instantiated 182 according to their respective configured dependencies and priorities. Some of the processes are started on all nodes 116-122 of the system 110, while others, e.g. HA Server 132/150 are started only on one node of each side of a duplex system. The system is shown as a duplex system in the Figures, however, as described previously, the system is not necessarily duplexed.

The system then enters a state 184 where configured applications and processes run as separate threads on various nodes of the system. The aforementioned HA Server 132 runs on one node 116 of the system if not running in a duplex mode. If a duplex system 110 is configured, a second copy of the HA Server 150 runs on one node 120 of the alternate side of the duplex system 110, preferably as a slave. As previously described, the HA Server 132 acts as the brains of the system 110 and communicates with the HA Spawner 128/138/146/156 and the remaining HA Server 150 (if any).

The HA Monitor 130/140/148/158 runs with a copy on all nodes 116-122 of the system 110 at step 188, each copy monitoring resources on its respective node under control of the HA Server 132/150. Each copy of the HA Monitor broadcasts determined states to both HA Servers 132, 150 of the system 110. The HA Spawner, likewise, runs a copy on all nodes 116-122 of the system 110 at step 190, each copy spawning commands and processes on its respective node as requested by other processes.

The HA Master 126/136/144/154 runs a copy on each node of the system at step 192. Each HA Master copy watches the remaining HA processes, e.g. HA Spawner, HA Monitor, HA Server (if present) and the HA Master Watcher, and starts or stops any as required. The HA Master Watcher 124/134/142/152 runs at step 194, and performs the task of watching the HA Master, and vice versa.

Various, configured tenant applications 40/150 and database applications 48/66 run on assigned nodes 116-122 of the system 110 under overall control of the HA Server 132/150 at step 196, and as previously described. The applications can be controlled and monitored on an individual basis, on a tenant basis, or overall.

For purposes of understanding the configuration file, a portion of an exemplary text configuration file is shown in FIG. 6. Although a text-based configuration file is illustrated, a binary configuration file, e.g., having a program for editing the configuration file falls within the scope of the present application. Lines 353-383 (200) of the configuration file are shown. Line 372 (202) defines the respective application as a tenant application, as opposed to, for example, a system application. Line 373 (204) instructs the system that all resources of this defined type can be referred to via the alias "tenant" and "reporting." Thus, a user can start a group of resources using, for example, "start type reporting" rather than having to individually start the associated resources. Line 374 (206) requests that the particular application be monitored every 15 seconds. Line 375 (208) assigns a relatively low priority of "4" to the application in regards to its startup priority. Typically, the database processes and other call processes would have a higher startup priority and be started before this particular application. Line 377 (210) defines a run status of "cold-standby" whereby only one copy of this particular application per tenant is allowed. On a pair of machines, as in the duplex system shown in the Figures, only one copy of this application will run at a time. Line 378 (212) establishes a dependency wherein the system resource type "ConfigServer" must be running on the system prior to starting this application. ConfigServer is another record in the HA.Resource Types file defining a resource type. There can be multiple ConfigServer resources defined in HA.Resources, and when any of these are started, other resource types depending on ConfigServer are also allowed to start. Line 379 (214), similarly, requires that a copy of the tenant's database server for reporting tenant information, "DBServer-CCA", be running before this application is started. In the event that ConfigServer restarts for any reason, line 380 (216) asks that the system bounce (stop/restart) this application at the same time.

The above-described exemplary configuration parameters are but a small portion of the parameters that can be configured into a configuration file. An advantage of such a text-based configuration file is that newly conceived parameters can be incorporated into the file without impacting any programs in the system 110 except those that are necessarily related to the newly conceived parameter.

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

I claim:

1. In a multi-tenant duplexed call-management system, said system hosting a plurality of processes, including a plurality of tenant application processes and a plurality of system processes, a method of configuring and monitoring said processes on said system, the method comprising:

configuring said system in a configuration file, said configuring including:
   defining dependencies between said plurality of processes,
   defining a monitoring frequency for each of said plurality of processes,
   defining a priority for each of said plurality of processes, and
   grouping selected processes of said plurality of processes into tenant groups;

reading said configuration file by the call-center system;

starting each of said plurality of processes in said duplexed call-center system in correspondence to said dependencies and said priorities, wherein said duplexed call-center system includes a first call-management system and a secondary call-management system similar to the first call-management system; and monitoring each of said plurality of processes based on said monitoring frequencies including:
   controlling each of said duplexed call-management systems with a respective High Availability (HA) Server process running on one node of each of said duplexed call-management systems,
   monitoring processes on each of said nodes under control of said HA Server process with a respective HA Monitor process running on the same node as said monitored processes, said HA Monitor process broadcasting a respective state of each of said monitored processes to all remaining nodes,
   starting and stopping selected processes of said monitored processes with a respective HA Spawner process running on the same node as said monitored processes in response to requests from said HA Server process, said HA Monitor process and an HA Master process,
   watching said HA Server process, said HA Monitor process and said HA Spawner process with an HA Master process running on the same node as the respective HA Server process, HA Monitor process and HA Spawner process, starting and stopping said watched processes in response to states of said watched processes, and watching said HA Master process with an HA Master Watcher process running on the same node as the respective HA Master process, said HA Master Watcher process starting and stopping said watched HA Master process in response to a state of said HA Master Process.

2. The method as set forth in claim 1, wherein the configuring further includes defining a run status for each of said plurality of processes comprising:

defining selected processes of said plurality of processes as cold-standby run status, wherein one copy of the selected process runs on one of the duplexed call-management systems while the remaining copy remains stopped or idle on the remaining call-management system;

defining selected processes of said plurality of processes as warm run status, wherein one copy of the selected process runs on one of the duplexed call-management systems while the remaining copy runs on the remaining call-management system, however, one of the copies is inactive;

defining selected processes of said plurality of processes as hot run status, wherein both copies of the selected application run, however, with one copy in standby, but with its state kept current with a state of the remaining copy; and defining selected processes of said plurality of processes as load sharing run status, wherein both copies of the selected process run and actively handle requests, sharing the overall load.

3. The method as set forth in claim 2, wherein each of said duplexed call-management system includes one or more load-sharing nodes, each node hosting selected processes.

4. The method as set forth in claim 1, wherein the monitoring further includes:

watching said HA Master Watcher process with said HA Master process running on the same node as the respective HA Master Watcher process, said HA Master process starting and stopping said watched HA Master Watcher process in response to a state of said HA Master Watcher process.

5. A multi-tenant duplexed call-management system, the system comprising:

a first call-management system including:
  a storage system for storing database files, processes and a configuration file,
  a computer system having memory for processing said database files and said configuration file and running selected processes stored on said storage system,
  a configuration server for reading said configuration file and serving configuration file data from said configuration file to requesting processes, and
  a monitor process for starting configured processes according to inter-process dependencies and process priorities as set forth in said configuration file, and for monitoring each of said started processes according to a respective monitor frequency in said configuration file, a second call-management system similar to the first call-management system, wherein the first and second call-management systems are duplexed call-management systems;

an High Availability (HA) Server process running on one node of each of said duplexed call-management systems controlling each of said duplexed call-management systems;

a HA Monitor process running on each of said nodes under control of said HA Server process with said HA Monitor process monitoring processes running on the same node as said HA Monitor process, said HA Monitor process broadcasting a respective state of each of said monitored processes to all remaining nodes;

an HA Spawner process starting and stopping selected processes of said monitored processes with a respective HA Spawner process running on the same node as said selected process in response to requests from said HA Server process, said HA Monitor process and an HA Master process;

an HA Master watching said HA Server process, said HA Monitor process and said HA Spawner process running on the same node as the respective HA Master process, starting and stopping said watched processes in response to states of said watched processes; and an HA Master Watcher process watching said HA Master process running on the same node as the respective HA Master Watcher process, said HA Master Watcher process starting and stopping said watched HA Master process in response to a state of said HA Master Process.

6. The multi-tenant call-management system as set forth in claim 5, wherein the call-management system is a duplexed system further including a second call-management system similar to the first call-management system and each of said call-management systems includes one or more nodes for sharing a processing load.

7. The multi-tenant call management system as set forth in claim 5, wherein said HA Master process watches said HA Master Watcher process running on the same node as the respective HA Master process, said HA Master process starting and stopping said watched HA Master Watcher process in response to a state of said HA Master Watcher process.

8. A call-center system, the system including:
a plurality of telephone lines;
a plurality of agent positions;
a call distribution system connecting said plurality of agent positions to said plurality of telephone lines;
a multi-tenant first call-management system connected to the call distribution system, including:
  a storage system for storing database files, processes and a configuration file defining dependencies between a plurality of processes, defining a monitoring frequency for each of said plurality of processes, defining a priority for each of said plurality of processes, and grouping selected processes of said plurality of processes into tenant groups,
  a computer system having memory for processing said database files and said configuration files and running selected processes stored on said storage system,
  a configuration server for reading said configuration file and serving configuration file data from said configuration file to requesting processes, and
  a monitor process for starting configured processes according to inter-process dependencies and process priorities as set forth in said configuration file, and for monitoring each of said started processes according to a respective monitor frequency in said configuration file;

a second call-management system similar to the first call-management system, wherein the first and second call-management systems are duplexed call-management systems;

an High Availability (HA) Server process running on one node of each of said duplexed call-management systems controlling each of said duplexed call-management systems;

a HA Monitor process running on each of said nodes under control of said HA Server process with said HA Monitor process monitoring processes running on the same node as said HA Monitor process, said HA Monitor process broadcasting a respective state of each of said monitored processes to all remaining nodes;

an HA Spawner process starting and stopping selected processes of said monitored processes with a respective HA Spawner process running on the same node as said selected process in response to requests from said HA Server process, said HA Monitor process and an HA Master process;

an HA Master watching said HA Server process, said HA Monitor process and said HA Spawner process running on the same node as the respective HA Master process, starting and stopping said watched processes in response to states of said watched processes; and an HA Master Watcher process watching said HA Master process running on the same node as the respective HA Master Watcher process, said HA Master Watcher process starting and stopping said watched HA Master process in response to a state of said HA Master Process.

9. The call-center system as set forth in claim 8, wherein each of said call-management systems includes one or more nodes for sharing a processing load.

10. The call-center system as set forth in claim 8, wherein said HA Master process watches said HA Master Watcher process running on the same node as the respective HA Master process, said HA Master process starting and stopping said watched HA Master Watcher process in response to a state of said HA Master Watcher process.

* * * * *